United States Patent [19]

Ward

[11] 3,860,683

[45] Jan. 14, 1975

[54] METHOD FOR BLOW MOLDING AN ARTICLE HAVING A RE-ENTRANT PORTION

[76] Inventor: Dennis H. Ward, 1, Garvock Dr., Kippington Rd., Sevenoaks, England

[22] Filed: June 25, 1973

[21] Appl. No.: 373,305

[30] Foreign Application Priority Data
July 27, 1972   Great Britain..................... 35167/72

[52] U.S. Cl...................... 264/96, 264/98, 264/296, 425/DIG. 214
[51] Int. Cl............................................. B29c 17/07
[58] Field of Search ............. 264/89, 93, 94, 96, 97, 264/98, 99, 296; 425/DIG. 214, 326 B, 387 B

[56] References Cited
UNITED STATES PATENTS

| | | | |
|---|---|---|---|
| 3,050,773 | 8/1962 | Hagen | 425/DIG. 214 |
| 3,275,726 | 9/1966 | Rudolph | 425/DIG. 214 |
| 3,507,942 | 4/1970 | Lynch | 264/96 |
| 3,736,201 | 5/1973 | Teraoka | 264/96 X |
| 3,764,644 | 10/1973 | Robinson | 264/94 X |
| 3,776,678 | 12/1973 | Saslawsky | 425/387 B X |
| 3,792,143 | 2/1974 | Branscum et al. | 264/89 X |
| 3,819,789 | 6/1974 | Parker | 264/296 X |

FOREIGN PATENTS OR APPLICATIONS

| | | | |
|---|---|---|---|
| 1,001,672 | 8/1965 | Great Britain | 264/98 |
| 220,099 | 11/1957 | Australia | 425/DIG. 214 |

*Primary Examiner*—Jan H. Silbaugh
*Attorney, Agent, or Firm*—Baldwin, Wight & Brown

[57]     ABSTRACT

A process for blow moulding hollow articles having shapes such as re-entrant portions. During blowing a portion of the mould which is in contact with the moulding material is moved from an open position to a closed position to form the re-entrant portion. Such movable mold portions can be provided at both ends of the mould so as to form plural re-entrant portions.

11 Claims, 1 Drawing Figure

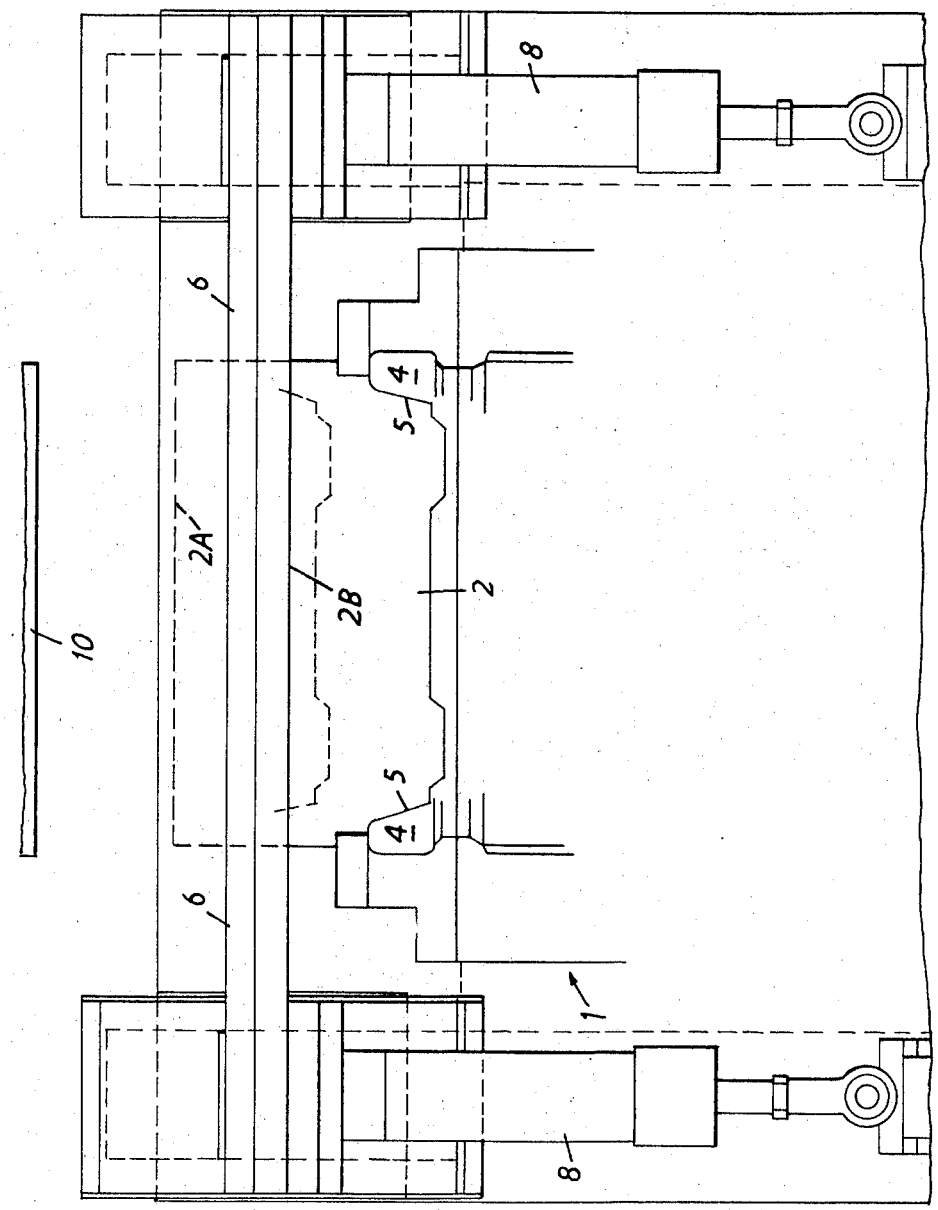

METHOD FOR BLOW MOLDING AN ARTICLE HAVING A RE-ENTRANT PORTION

This invention relates to blow moulding and is more particularly concerned with blow moulding of hollow bodies.

Various proposals have been made to blow mould hollow bodies in plastics materials of shapes which include forms such as re-entrant forms but these have all suffered from various drawbacks. Even where it has been possible to mould such re-entrant shapes this has resulted in excessive thinning of the wall of the re-entrant part and thus rendering it quite unsatisfactory event for the lightest uses.

Various proposals have been made to overcome this difficulty. For example, in one proposal the molten plastics material has been permitted to flow under its own weight into the base of the mould and there to flow around the re-entrant form. This produces a very unsatisfactory difference in wall thickness in various parts of the moulding and also only the bottom of the mould could be formed in this way as the plastics material would not flow into the top of the mould. In addition, this part of the operation takes place prior to the actual blow moulding operation proper and, moreover, occupies a considerable time as during blow moulding proper the whole of the plastic container is formed in a single blowing operation where any part of the mould can be reached by air pressure.

In view of the difficulties mentioned above if hollow bodies involving shapes such as re-entrant shapes in their design are to be formed in a plastics material these have hitherto invariably been made not by blow moulding but by rotational moulding. This is achieved by introducing a quantity of finely powdered thermoplastic material into a mould which is then heated and rotated in two planes so that the powdered material is flung against the hot walls of the mould to which it adheres and subsequently fuses together to form a moulded wall. This method has been found satisfactory in producing bodies having re-entrant portions but it suffers from many practical difficulties and drawbacks and blow moulding is faster and cheaper and can be used in connection with thermoplastics material which would present difficulties with rotational moulding.

It is an object of the present invention to provide a method of producing hollow bodies having shapes such as a re-entrant portions by a blow moulding process.

According to the present invention a method of making a moulded article by blow moulding a plastics material comprises moving a portion of the mould in contact with the moulding material during the blowing operation. Thus the movement of a portion of the plastics material in the mould can be controlled while the blowing operation is actually taking place and the thickness of the material regulated.

In one preferred arrangement the portion of the mould is arranged to close against the moulding material, preferably into a position in which it extends into the mould beyond the walls of the mould so as to form a re-entrant portion in the moulded article.

In one arrangement the movable portion of the mould may be at one end of the mould. Where the portion extends into the mould beyond the walls of the mould to form a re-entrant portion the movable portion is preferably withdrawn from the mould after the moulding operation and before the mould is opened to withdraw the moulded article.

In one convenient arrangement the movable portion may be in two separate parts and in this case the mould is preferably also separable into two parts and the parts of the movable portion and of the mould are separable on the same plane. The separable parts of the mould and the movable portion conveniently move simultaneously and synchronously.

In one construction the separable parts of the movable portion are arranged to permit the moulding material to be introduced through them into the mould. The separable parts of the movable portion may also close to clamp the moulding material either before blowing commences or in the case known as "early blow" where air is introduced into the moulding material before the mould itself has actually been clamped around it, after the blowing operation has started.

In one construction the movable portion may be arranged to form with the mould an annular re-entrant base form on the moulded article.

There may be more than one portion of the mould formed to be movable and in this case, for example, a movable portion may be provided at each end of the mould to form a re-entrant portion on each end of a moulded product. With this arrangement a moulded article may be formed with a hollow top and hollow base and the arrangement is particularly suitable for forming a moulded product having the shape of a conventional drum such as a steel drum.

The movable portion or portions may be arranged in locations other than at the ends of the mould and in one arrangement may be at any position or positions along the length of the mould. This arrangement is particularly useful where waisted portions are formed, in which case two movable portions may be arranged to move inwardly to form such waisted portions, e.g., to form baffles.

The invention may be performed in various ways and one specific embodiment will now be described by way of example and with reference to the accompanying diagrammatic Drawing which shows in cross section at one end of a mould for use with the present invention.

The mould shown in the drawing comprises two half portions divided in the plane of the paper and only one of which is shown and indicated generally at 1. Each half portion is supported in a press and is arranged to be movable into contact with and away from the other half portion in directions perpendicular to the plane of the paper by conventional hydraulic piston and cylinder assemblies (not shown).

The end of the mould is formed as a punt 2 movable between an open position shown in broken lines at 2A and a closed position shown in full lines at 2B. In this latter position its base extends into the mould beyond the upper walls 3 of the mould to provide an annular cavity 4 into which moulding material enters as more fully explained below and which moulding provides an annular flange surrounding a re-entrant portion 5 in the finished product.

The movable punt 2 is also divided into two half portions in the same manner as the half portions of the mould and which are coupled to the half portions of the mould and may move simultaneously and synchronously with them.

Each half of the movable punt 2 is supported on a cross member 6 secured to its upper surface. The ends of the cross member 6 are coupled to hydraulic rams 8 on each side of the mould which operate in synchronism to raise and lower each half of the punt during moulding operations.

The operation of the blow moulding process in accordance with the invention is as follows. At the commencement of a blow moulding operation the two halves of the mould are in an open position in the press supporting them, i.e., with the two halves moved apart from one another. At this stage the movable punt is also in its open position, i.e., positioned above the mould as shown in broken lines and also with its two halves separated.

In this position at the commencement of a moulding operation a head 10 containing molten plastics material extrudes the material into the form of a tube downwards into the mould between the two halves of the punt 2 and the mould so that the lower end of the tube engages over a nozzle for supplying compressed air. When the required length has been extruded the two halves of the mould are then closed around the tube thus sealing the ends of the bottom and sealing the ends at the top by the simultaneous enclosure of the two halves of the moving punt which at this position in its operation is still in the raised position.

With the mould closed but the punt 2 still in position shown in broken lines with its two halves engaged compressed air used for the blow moulding operation is then introduced in the normal way into the tube as part of the operation for expanding the molten tube to the shape of the mould cavity. In the initial stages the air supports the tube and as it starts to expand it produces a bubble of molten plastics material which is suspended from the punt 2. As this bubble commences to form the punt is moved downwardly at a predetermined time and speed so as to push against the bubble making it conform to the shape of the moving punt 2 as it enters the bubble without stretching and thus avoiding a thinning of the plastics material. The distance between the punt 2 and the mould is selected according to the material and the shape and size of the article being formed to avoid any stretching of this material.

At the end of the stroke of the moving punt 2 the punt seals off the mould having completed the press forming of the air supported bubble of the plastics material. The mould is now in the normal condition for blow moulding and blowing proceeds in the conventional way, air pressure being maintained within the mould to keep the molten plastics material in intimate contact with the cold surfaces of the mould until the plastic is chilled and set to its moulded form.

At the conclusion of the blowing and cooling process the moving punt 2 is first raised upwardly to its original open position as shown in the drawing in broken lines so as to clear the re-entrant form which the plastics material has taken. This then enables the mould halves 1 and 2 to be opened in the normal manner and the moulding thus produced to be removed. It will be appreciated that the upward movement of the punt is necessary in order to enable the mould to be opened.

Whilst the above has been described only in relation to one end of a container the container could be formed at both ends with a similar shaped re-entrant portion. The re-entrant shapes at the ends of the mould necessitate the moving of the punt before the mould can be opened. However, such shapes could be moulded in the body sections of the mould without this difficulty and, for example, if such shapes are moulded on the horizontal axis of the mould it would be possible to open the mould without having to retract the shaped parts of the mould first.

The present method may be also applied to a blow mould in which the moulded form has a heavily waisted shape. With the conventional blow moulding techniques hitherto used this could be moulded by blow moulding but a considerable additional thickness of material would accrue in the wall of the narrow waisted section with corresponding thinning as the diameter increased beyond this. This could be avoided by having moving parts of the mould which remain extended at the outside extremity or beyond of the mould form, expanding the molten tube of plastics material until it was beyond or in close proximity to the walls of the mould, then moving the formed pieces of the mould inwards to produce a waisted section which pieces would be timed so as to deflect and form the molten plastics tube and produce an extreme waisted form with a minimum of wall thickness difference. The waisted portions could be formed on any shape of container and could be used to form baffles in a container for example, to inhibit movement of the liquid in the container.

Moreover, the present invention enables drums and similar containers to be manufactured which have previously had to be designed with a generously radiused shaped without re-entrant forms in order to facilitate the employment of a blow moulding operation in its manufacture. The present invention permits the production of such items in designs generally more desirable and more conventional and which allows established practices in handling methods and equipment to be used with little or no variation. In one example the invention may be used to manufacture in plastics material drums having substantially the same shape as conventional steel drums, i.e., drums normally having a capacity of 45 gallons or thereabouts and of cylindrical form, possibly with one or more integrally formed raised hoops surrounding them and with flat end walls recessed inwardly from the ends of the cylinder to leave an annular axially directed flange at each end. Such drums are well known and are used in particular for the storage and transport of liquid products e.g., petroleum products or chemical products. It will be appreciated that in order to manufacture such drums the mould will be provided with movable punts at each end and with appropriate modifications to the punt profile to provide the required recessed end form.

I claim:

1. A method of making a moulded article by blow moulding a plastics material comprising the steps of extruding plastics material in the form of a tube into a mould having an open portion said open portion being in two separable parts movable between an open position and a plastics material clamping position, closing the ends of said tube including the step of moving together the separable parts of said open portion to clamp closed one end of the tube therebetween, applying gas under pressure to the closed tube, said pressure being applied continuously during the whole of the moulding operation, and during said continued application of said gas pressure closing the open portion of the mould against the expanding plastics material to form a re-entrant portion of an article being moulded.

2. A method as claimed in claim 1 in which the mould is of an openable construction, and the open mould portion is withdrawn from the mould after the moulding operation and before the mould is opened to withdraw the moulded article.

3. A method as claimed in claim 1 in which the mould is also separable into two parts and the two separable parts of both the mould and the open mould portion are separable on the same plane.

4. A method as claimed in claim 3 in which the separable parts of the mould and the open mould portion moves simultaneously and synchronously to plastics material enclosing positions.

5. A method as claimed in claim 1 in which one of said open mould portions is provided at each end of the mould to form a re-entrant portion on each end of a moulded product.

6. A method as claimed in claim 5 in which the mould and open mould portions are arranged to form a hollow body having an annular axially directed flange at each end.

7. A method of forming by blow moulding a member including a tubular body and an end wall having a re-entrant portion, said method comprising the steps of providing a mould including a body moulding portion and an end moulding portion of axially split construction with the end moulding portion being movable between an open position spaced axially from the body moulding portion and a closed position cooperating with the body moulding portion, with the end moulding portion in its open and axially split position extruding plastics material in the form of a tube therethrough into the body moulding portion and to a position extending between the body moulding portion and the end moulding portion, clamping the plastics material tube in end sealing relation by the end moulding portion, expanding the plastics material tube by applying gas under pressure thereto, and during the application of gas under pressure moving the end moulding portion axially of the plastics material tube to its closed position and moving that portion of the plastics material tube initially between the body moulding portion and the end moulding portion axially of the plastics material tube into the body moulding portion to form said re-entrant portion.

8. The method of claim 7 wherein the end moulding portion projects into the body moulding portion and forms a re-entrant portion between the article body and end wall.

9. The method of claim 7 wherein the body moulding portion is also of an axially split construction, and the body moulding portion and the end moulding portion are simultaneously and synchronously closed from split conditions to plastics material tube enclosing positions.

10. The method of claim 7 wherein that portion of the plastics material tube disposed between the end moulding portion and the body moulding portion is transversely expanded by gaseous pressure therein prior to movement of the end moulding portion to its closed position.

11. The method of claim 10 wherein the end moulding portion projects into the body moulding portion and forms a re-entrant portion between the article body and end wall.

* * * * *